United States Patent [19]

Gagliardi, Jr.

[11] Patent Number: 5,266,064
[45] Date of Patent: Nov. 30, 1993

[54] METHOD OF MAKING A FOOD PRODUCT FROM THE THIGH OF A BIRD AND FOOD PRODUCT MADE IN ACCORDANCE WITH THE METHOD

[75] Inventor: Eugene D. Gagliardi, Jr., West Chester, Pa.

[73] Assignee: Designer Foods, Inc., Wilmington, Del.

[21] Appl. No.: 863,990

[22] Filed: Apr. 6, 1992

Related U.S. Application Data

[63] Continuation-in-part of Ser. No. 685,324, Apr. 15, 1991.

[51] Int. Cl.$^5$ ............................................. A22C 21/00
[52] U.S. Cl. .................................... 452/135; 452/149
[58] Field of Search ............... 452/135, 149, 165, 170; 426/644, 645

[56] References Cited

U.S. PATENT DOCUMENTS 3,644,125  2/1972  Cobrondo et al. ................. 452/135
4,967,447  11/1990 Romaine ............................ 452/135

FOREIGN PATENT DOCUMENTS 2566629  1/1986  France ............................. 426/644

*Primary Examiner*—Willis Little
*Attorney, Agent, or Firm*—Panitch Schwarze Jacobs & Nadel

[57] ABSTRACT

A method of making a food product from the thigh of a bird comprises cutting the thigh along a first cut line extending generally parallel to the axis of the thigh and generally perpendicular to upper and lower surfaces of the thigh to remove a first side portion of thigh meat. The thigh is also cut along a second cut line extending generally parallel to the axis and generally perpendicular to the upper and lower surfaces to remove a side portion of thigh meat. The first and second cut lines are spaced from the bone by first and second predetermined distances. The first and second side portions of thigh meat are cut into a plurality of elongated strips, each strip having a predetermined width. In the preferred embodiment, the thigh meat is marinated either before or after being cut into the elongated strips.

12 Claims, 3 Drawing Sheets

METHOD OF MAKING A FOOD PRODUCT FROM THE THIGH OF A BIRD AND FOOD PRODUCT MADE IN ACCORDANCE WITH THE METHOD

CROSS REFERENCE TO RELATED APPLICATION

This application is a continuation-in-part of U.S. patent application Ser. No. 7/685,324, filed Apr. 15, 1991, and entitled "A Dressed Thigh Cut of Poultry and Method of Dressing the Same".

BACKGROUND OF THE INVENTION

The present invention generally relates to a method of making a food product from the thigh of a bird as well as the food product produced thereby, and, more particularly to a food product comprising an elongated strip of thigh meat.

Birds, such as poultry and fowl, are conventionally eviscerated, dressed and sold either as a whole bird or as severed parts, i.e., breasts, thighs, wings, etc. One of the parts which is often separated and sold is the upper portion of the bird leg, generally referred to as the thigh. Typically, thighs are sold with the skin in place and with the thigh meat surrounding an elongated bone extending generally from one end of the thigh to the other.

In recent years, there has been an increasing demand for innovative meat products, particularly products which require less time for preparation and which include little or no waste. There has also been an increasing demand for meat products which are boneless or relatively boneless, making such products easier to consume. Hence, products such as boneless chicken breasts, chicken tenders, etc., have enjoyed tremendous commercial success. Other innovative products such as "hot wings", "buffalo wings", etc., have also obtained enhanced popularity for the respective cuts from which they are prepared.

Until recently, some bird parts such as thighs and drumsticks have not been particularly amenable to such enhanced commercial processing and/or preparation methods for a variety of reasons primarily related to the type of meat (dark versus light), the size and centralized location of the bone, etc.

Co-pending U.S. patent application Ser. No. 07/685,324, filed Apr. 15, 1991, discloses a method of dressing a thigh cut of poultry which essentially involves removing a portion of the meat from each side of the thigh to provide a cut which is generally square or parallelogram-shaped on all sides of the bone thereby facilitating consumption. The present invention comprises a method of making a unique food product from the removed side portions or side lobes of thigh meat. The food product comprises a plurality of elongated strips of thigh meat, each strip having a predetermined width of approximately one-eighth of an inch in the preferred embodiment. The present invention also comprises a method of preparing the elongated thigh meat strips utilizing a marinating process. Finally, the present invention comprises, in an alternate embodiment, a method of forming such elongated strips from a generally boneless thigh cut.

SUMMARY OF THE INVENTION

Briefly stated, the present invention comprises a method of making a food product from the thigh of a bird, the thigh having an upper surface, a lower surface, and an elongated bone having an axis extending generally from one end of the thigh to the other end of the thigh generally between the upper and lower surfaces. The method comprises the steps of cutting the thigh along a first cut line extending generally parallel to the axis and generally perpendicular to the upper and lower surfaces to remove a first side portion of thigh meat, the first cut line being spaced from the bone by a first predetermined distance. The thigh is also cut along a second cut line extending generally parallel to the axis and generally perpendicular to the upper and lower surfaces to remove a second side portion of thigh meat, the second cut also being spaced from the bone by a second predetermined distance. The first and second side portions of thigh meat are cut into a plurality of elongated strips, each strip having a predetermined width. In the presently preferred embodiment, the predetermined width is generally one-eighth of an inch.

BRIEF DESCRIPTION OF THE DRAWINGS

The foregoing summary, as well as the following detailed description, will be better understood when read in conjunction with the appended drawings. For the purpose of illustrating the invention, there is shown in the drawings an embodiment which is presently preferred, it being understood, however, that this invention is not limited to the precise arrangements and instrumentalities shown. In the drawings.

DETAILED DESCRIPTION OF PREFERRED EMBODIMENT

Figure 1:
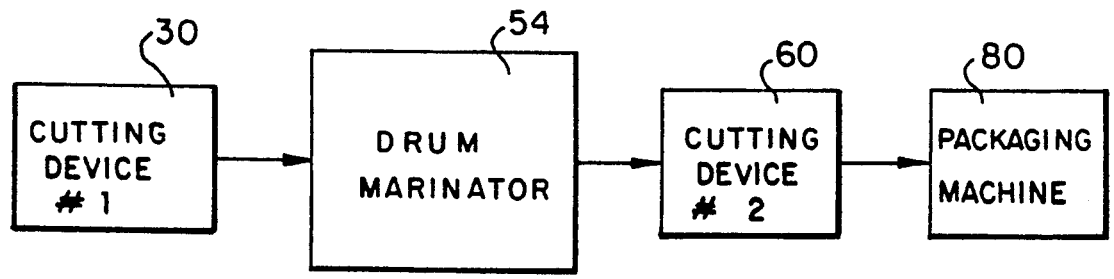
FIG. 1 is a schematic representation of the steps in preparing a preferred embodiment of a food product in accordance with the present invention.
Figure 2:
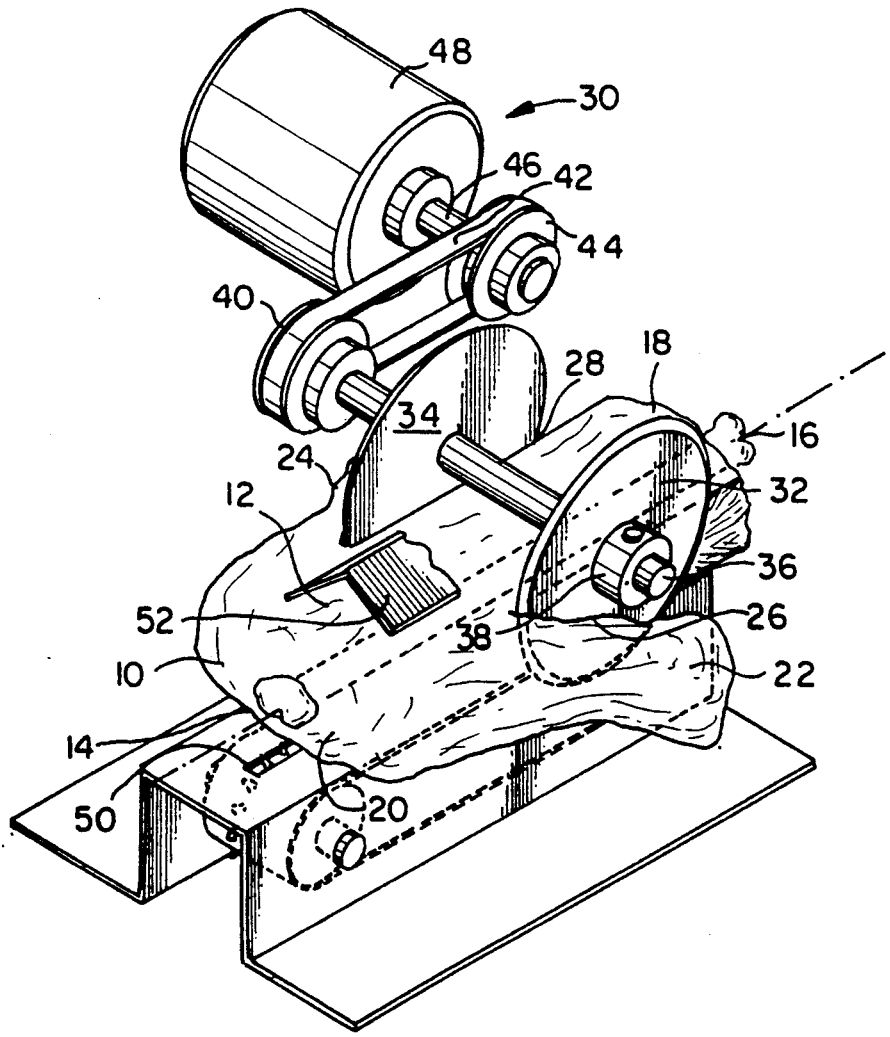
FIG. 2 is a schematic representation of a first cutting apparatus employed in performing the first step of the method illustrated in FIG. 1.

Referring to the drawings in detail, wherein like numerals indicate like elements throughout, there is shown in FIG. 1 a schematic representation of the steps involved in preparing a preferred embodiment of a food product in accordance with the present invention. The food product is prepared from a thigh cut of a bird, preferably fowl or poultry. A typical thigh cut 10 is illustrated in FIG. 2. The thigh cut 10 illustrated in FIG. 2 is a chicken thigh, it being clearly understood that the present invention is not limited to a particular type of poultry or fowl but is equally applicable to any and all birds.

The thigh cut 10 as illustrated in FIG. 2 includes an upper surface 12, a lower surface 14, and an elongated bone 16 having an axis and extending generally from one end 18 of the thigh cut 10 to the other end 20 of the thigh cut generally midway between the upper surface 12 and the lower surface 14. As is typical in any thigh cut, the thigh meat generally surrounds the bone 16 between the upper surface 12 and the lower surface 14 with the preponderance of the meat extending outwardly from the bone 16 on the sides 22 and 24. The thigh cut may also include skin (not shown) which, if desired, may be removed from the thigh cut 10 or may be retained on the thigh cut 10 in practicing the present invention.

Referring again to FIG. 1, in the preferred embodiment, the invention comprises four steps. The first step involves cutting the thigh 10 to remove first and second portions or lobes of thigh meat from the sides 22 and 24 of the thigh cut 10. The first and second side portions 22 and 24 are removed by cutting the thigh 10 along a first cut line 26 (FIG. 2) extending generally parallel to the axis and generally perpendicular to the upper and lower surfaces 12 and 14. The first cut line 26 is spaced from the bone 16 by a first predetermined distance which effectively establishes the thickness of the first side portion 22. The thigh cut 10 is also cut along a second cut line 28 which also extends generally parallel to the axis and generally perpendicular to the upper and lower surfaces 12 and 14 to remove the second side portion of thigh meat 24. The second cut line 28 is also spaced from the bone by a second predetermined distance to generally establish the thickness or width of the second side portion of thigh meat 24. Preferably, the first and second predetermined distances are equal to each other and are approximately equal to one-half of the distance between the upper surface 12 and the lower surface 14. However, the first and second predetermined distances may be different and may vary depending upon such factors as the type or size (side to side) of the thigh being cut and the amount of thigh meat, if any, to be left on the bone 16.

FIG. 2 schematically illustrates a preferred embodiment of a first cutting apparatus or device 30 which may be employed in removing the first and second side portions 22 and 24 from a thigh cut 10. The first cutting apparatus 30 includes a pair of generally disk-like, generally parallel, spaced cutting blades 32 and 34, each of which are secured to a generally cylindrical shaft 36. Preferably, the cutting blades 32 and 34 are made of stainless steel or some other high strength material suitable for the preparation of food and are removably secured to the shaft 36 utilizing a bushing and threaded pin arrangement 38 (only one shown) in a manner which is generally well-known in the art. In this manner, the distance between the cutting blades 32 and 34 may be conveniently adjusted in order to accommodate thigh cuts 10 of varying types and sizes.

The shaft 36 is rotatably mounted preferably utilizing bearings (not shown) within suitable supporting members (not shown) so that rotation of the shaft 36 results in corresponding rotation of both of the cutting blades 32 and 34. A drive member, in the present embodiment a drive sprocket or pulley 40, is secured to one end of the shaft 36. The drive member 40 is engaged by a transmission member, in the present embodiment a drive belt 42 preferably under tension. The transmission member 42 similarly engages a second drive member, in the present embodiment, also a drive sprocket or pulley 44, which is secured to the drive shaft 46 of a rotating drive source, in the presently preferred embodiment an electrically operated motor 48. Thus, providing electrical power to the motor 48 results in rotation of the motor drive shaft 46 and concurrent rotation of the drive member 44 which is secured to the motor drive shaft 46. Rotational movement of the drive member 44 causes corresponding rotation of the transmission member 42 which in turn causes rotation of both the drive member 40 and the shaft 36 to which the drive member 40 is secured. Rotation of the shaft 36 results in corresponding rotation of the cutting blade 32 and 34 for cutting the first and second side portions 22 and 24 off of the thigh cut 10 in the manner illustrated in FIG. 2. It will be appreciated that the above-described mechanical drive system, while presently preferred, is but one example of a means for causing rotation of the cutting blades 32 and 34. Other drive systems, such as a direct drive from the motor 48, a geared drive system, etc., may alternatively be employed. Likewise, a different drive source, such as a steam or gas-powered motor, could be employed if desired. It should also be understood that some other type of cutting means, other than blades 32 and 34, could be used if desired.

A conveyor apparatus 50 may be employed for moving the thigh cut 10 toward the rotating cutting blades 32 and 34. Similarly, a guide member 52, preferably in the shape of an inverted "V" in cross section, or some other retaining device, may be disposed above the thigh cut 10 for retaining the thigh cut in place on the conveyor during the cutting step.

It will be appreciated by those skilled in the art that while FIG. 2 illustrates a first cutting apparatus 30 which is presently preferred for performing the first step in the method of the present invention, the present invention is not limited to the particular cutting apparatus 30 as described above and as illustrated in FIG. 2, and that any other means may be employed for cutting the thigh cut 10 to remove the first and second thigh meat side portions 22 and 24. Likewise, while the first cutting apparatus 30, as illustrated in FIG. 2, shows the cutting blades 32 and 34 as being generally parallel and spaced apart a first predetermined distance to establish the thickness or width of the thigh cut side portions 22 and 24, it will be appreciated that the present invention is not limited to side portions 22 and 24 having a particular thickness or width.

In the next step of the preferred embodiment of the present invention, the first and second side portions of thigh meat 22 and 24 are marinated preferably for a predetermined period of time. Preferably, marination of the first and second side portions 22 and 24 is accomplished in a drum marinator illustrated schematically at 54. The drum marinator 54 employed in the presently preferred embodiment is a "Vacuum Massage Tumbler" commercially available from Robert Reiser & Co. Inc., or similar machine. Further details of the structure and operation of the drum marinator 54 are available from the manufacturers and are not necessary for a complete understanding of the present invention. While the presently preferred embodiment employs a drum marinator 54, it will be appreciated by those skilled in the art that any other type of marinating device or apparatus or any type of marinating method may alternatively be employed without departing from the scope of the present invention.

In the presently preferred embodiment, marinating is accomplished utilizing a standard off-the-shelf marinade mixture. However, any type of marinade mixture could be employed.

Figure 3:
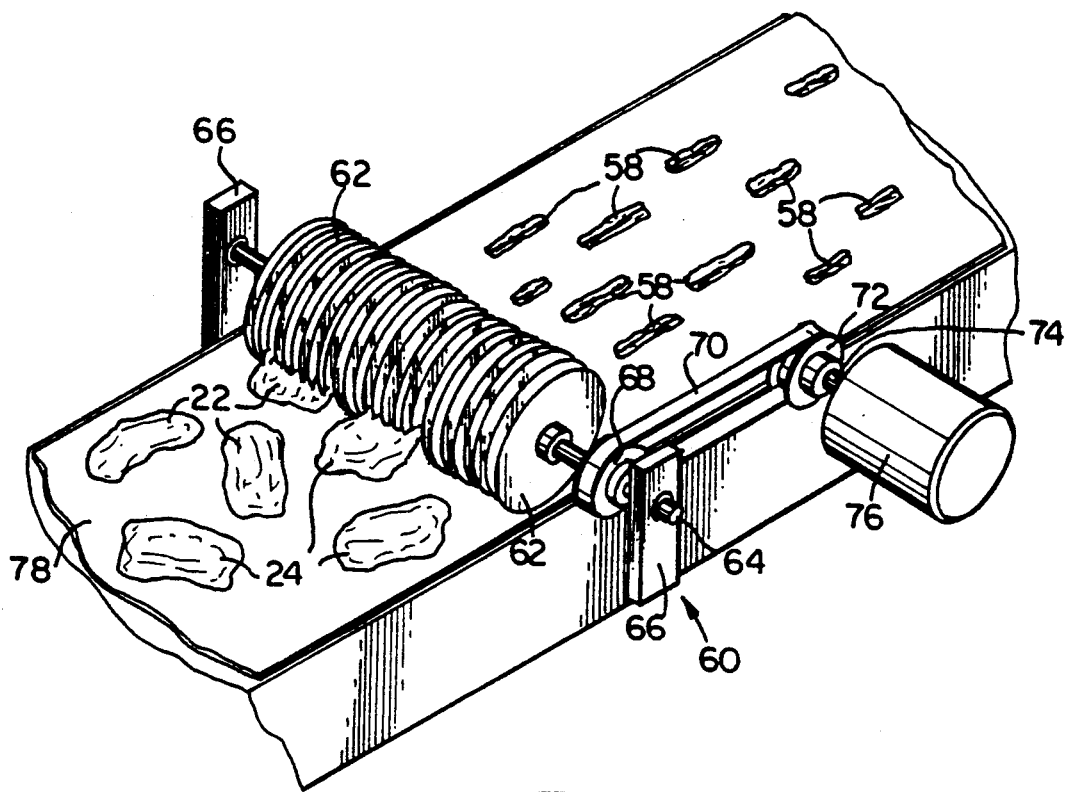
FIG. 3 is a schematic representation of a second cutting apparatus employed in performing the third step of the method illustrated in FIG. 1.

After completion of the marinating step, the first and second side portions of thigh meat 22 and 24 are cut into a plurality of elongated strips 58, each strip having a predetermined width. FIG. 3 illustrates schematically a preferred embodiment of a second cutting apparatus or device 60 which may be employed for cutting the side portions 22 and 24 into the elongated strips 58. The second cutting apparatus 60 includes a plurality of generally parallel disklike cutting blades 62, each of which are removably secured to an elongated shaft 64 in substantially the same manner as discussed above in connection with cutting apparatus 30. In the presently preferred embodiment 30 generally parallel cutting blades 62 are employed although a lesser number of blades is illustrated in FIG. 3. The cutting blades 62 are preferably made of stainless steel or some other high strength material suitable for the preparation of food. In the presently preferred embodiment, each of the cutting blades 62 are spaced apart from each other by a single predetermined distance which is preferably approximately one-eighth of an inch. It will be appreciated by those skilled in the art that the number of blades employed and the precise spacing between the blades may be varied without departing from the scope of the present invention. It will also be appreciated that the spacing between the blades 62 need not be the same for all of the blades so that different blade spacing may yield elongated strips 58 of different widths.

The elongated shaft 64 is rotatably supported proximate each end by support members 66 and suitable bearings (not shown). A drive member, in the present embodiment a sprocket or pulley 68, is secured to the shaft 64 for rotation therewith. A suitable transmission member or drive belt 70, preferably under tension, engages the drive member 68 and a corresponding drive member 72 which is fixed to a rotating drive source, preferably the output drive shaft 74 of a motor 76, preferably an electric motor. Operation of the motor 76 results in rotation of the motor drive shaft 74, rotation of the belt 70, rotation of the drive shaft 64, and a corresponding rotation of each of the cutting blades 62. It will be appreciated by those skilled in the art that alternative means, such as discussed above, may be employed to drive the cutting blades 62.

A conveyor means 78 is employed for moving the first and second side portions 22 and 24 into engagement with the rotating cutting blade 62 for cutting the side portions 22 and 24 into the elongated strips 58. Guide means, not shown, may be employed to facilitate feeding of the side portions 22 and 24 into the rotating cutting blades 62. It will be appreciated by those skilled in the art that the side portions 22 and 24 may be fed into the cutting blade 62 at any angle or orientation and, preferably, are fed into the blades 62 in a generally random orientation. In this manner, the length of the elongated strips 58 will vary as illustrated, although each strip will have a predetermined thickness.

The final step in the preferred embodiment of the present invention involves packaging a plurality of the elongated strips for shipping. In the presently preferred embodiment, a packaging machine 80 is employed for packaging the elongated strips 58 into a suitable container (not shown), preferably a generally cylindrical casing. In the presently preferred embodiment, the packaging machine 80 is a VEMAG automatic vacuum filling machine available from Robert Reiser & Co., Inc. Details concerning the structure and operation of the packaging machine 80 are available from the manufacturer and are not necessary for a complete understanding of the present invention. It should be appreciated by those skilled in the art that any other type of packaging machine or methods may be employed for packaging the elongated strips 58 for storage and/or shipment.

It will be appreciated that while the presently preferred method of practicing the invention is illustrated in FIG. 1, certain changes, which would be obvious to one of ordinary skill in the art, can be made to one or more of the method steps without affecting the resulting product. For example, the marinating step can be completely eliminated. Similarly, the marinating step can be accomplished after the formation of the elongated thigh meat strips 58.

Figure 4:
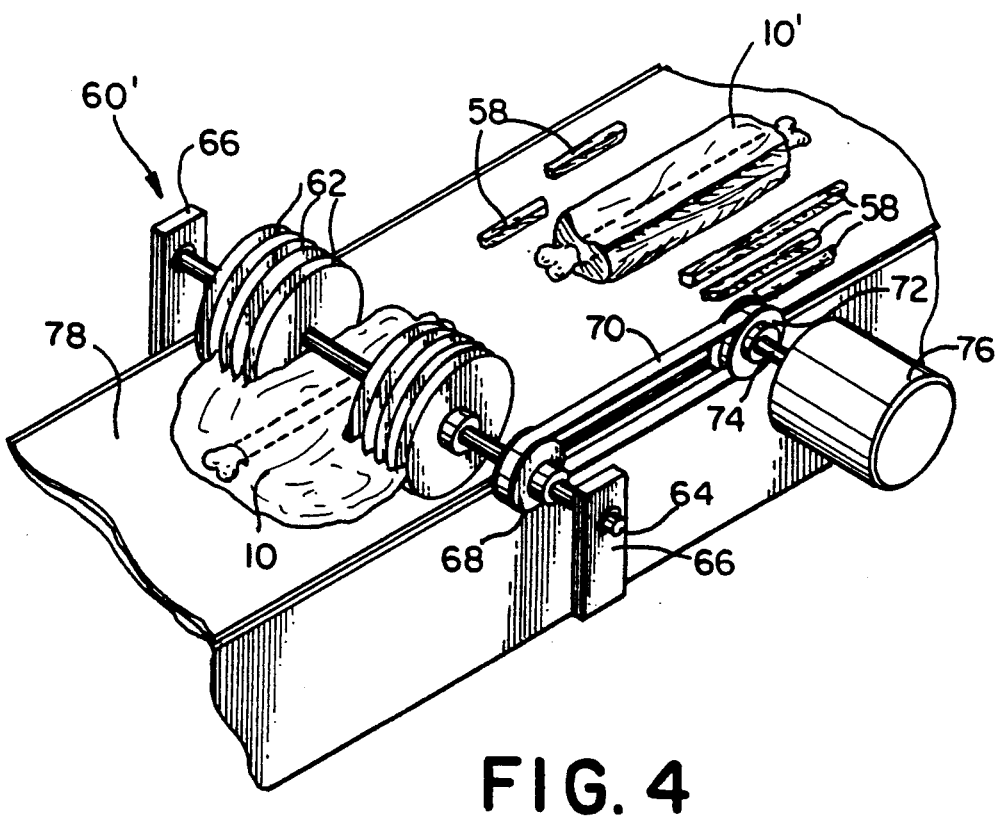
FIG. 4 is a schematic illustration of an apparatus which may be employed in simultaneously performing the first and third steps of an alternate embodiment of the method shown in FIG. 1.

FIG. 4 illustrates an alternate embodiment of a cutting apparatus or device 60'. The cutting apparatus 60' is exactly the same as the cutting apparatus 60 illustrated in FIG. 3 except that the number of cutting blades 62 has been decreased. In addition, a space is provided between two different groups of cutting blades 62, the space being substantially the same as the space between the cutting blades 32 and 34 of the first cutting apparatus 30 shown in FIG. 2. The cutting apparatus 60' of FIG. 4 is thus able to accomplish substantially the same result as the combination of the first cutting apparatus 30 (FIG. 2) and the second cutting apparatus 60 (FIG. 3) in a single step. When a thigh cut 10 is properly aligned on the conveyor means 78, as illustrated in FIG. 4, the cutting blade 62 both severs the side cuts 22 and 24 from the remainder of the thigh cut 10' and, simultaneously, cuts the side portions 22 and 24 into the elongated strips 58.

Figure 5:
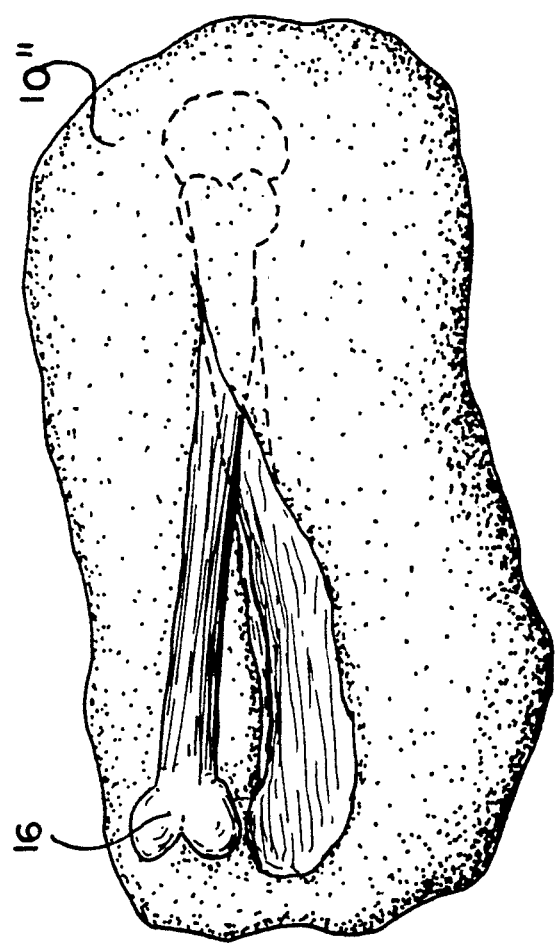
FIG. 5 is an illustration of a thigh with the bone partially removed.

The embodiments thus far described involve the processing of a thigh cut 10, including the thigh bone 16 contained therein. It will be appreciated by those skilled in the art that the present invention may alternatively be employed in connection with a boneless thigh cut which in appearance is substantially the same as side portions 22 and 24 in FIG. 3. In so employing the present invention, as illustrated in FIG. 5, the thigh bone 16 is initially removed from the thigh cut 10" so that the remaining thigh cut is essentially boneless. The boneless thigh cut 10" is then cut into a plurality of elongated strips 58, each strip 58 having a predetermined width. Preferably, the second cutting apparatus 60 of FIG. 3 may be conveniently employed in the same manner as described above for cutting the boneless thigh 10" into the elongated strips 58. Preferably, each of the elongated strips 58 has a width which is generally one-eighth of an inch or more, depending upon the spacing of the blades 62 of the cutting apparatus 60.

From the foregoing description, it can be seen that the present invention comprises a new and unique method of making a food product from the thigh of a bird and the food product resulting therefrom. It will be recognized by those skilled in the art that changes could be made to the above-described embodiments of the invention without departing from the broad inventive concepts thereof. For example, all of the cutting steps could be done by hand utilizing a knife or other such hand-operated cutting implement. It is understood, therefore, that this invention is not limited to the particular embodiments disclosed, but is intended to cover all modifications which are within the spirit and scope of the invention as defined by the appended claims.

I claim:

1. A method of making a food product from the thigh of a bird, the thigh having an upper surface, a lower surface, and an elongated bone having an axis, extending generally from one end of the thigh to the other end of the thigh generally between the upper surface and the lower surface, the method comprising the steps of:
    (a) cutting the thigh along a first cut line extending generally parallel to the axis and generally perpendicular to the upper and lower surfaces to remove a first side portion of thigh meat, the first cut line being spaced from the bone by a first predetermined distance;

(b) cutting the thigh along a second cut line extending generally parallel to the axis and generally perpendicular to the upper and lower surfaces to remove a second side portion of thigh meat, the second cut line being spaced from the bone by a second predetermined distance; and (c) cutting the first and second side portions of thigh meat into a plurality of elongated strips, each strip having a predetermined width.

2. The method as recited in claim 1 wherein the first and second predetermined distances are approximately equal to one-half of the distance from the upper surface of the thigh to the lower surface of the thigh proximate the bone.

3. The method as recited in claim 1 wherein steps (a) and (b) are performed simultaneously, and step (c) is performed after steps (a) and (b).

4. The method as recited in claim 1 wherein steps (a), (b) and (c) are performed simultaneously.

5. The method as recited in claim 1 wherein the predetermined width of the strips is generally one-eighth of an inch.

6. The method as recited in claim 1 wherein the first and second side portions of thigh meat are cut along generally parallel cut lines extending generally perpendicular to the upper and lower surfaces and generally parallel to the axis to form the strips.

7. The method as recited in claim 1 wherein the first and second side portions of thigh meat are cut utilizing a plurality of generally parallel, generally equal spaced cutting blades.

8. A food product made in accordance with the method of claim 5.

9. A food product made in accordance with the method of claim 1.

10. The method as recited in claim 1 wherein the first and second side portions of thigh meat are marinated for a predetermined period of time prior to performing step (c).

11. A method of making a food product from the thigh of a bird, the thigh having a bone extending generally from end of the thigh to the other end of the thigh, the method comprising the steps of:

(a) removing the bone from the thigh to provide a generally boneless thigh cut;

(b) marinating the boneless thigh cut for a predetermined period of time; and (c) cutting the boneless thigh cut into a plurality of elongated strips, each stop having a predetermined width.

12. A food product made in accordance with the method (a) removing the bone from the thigh to provide a generally boneless thigh cut;

(b) marinating the boneless thigh cut for a predetermined period of time; and (c) cutting the boneless thigh cut into a plurality of elongated strips, each strip having a predetermined width.

* * * * *